April 29, 1930.  A. WENDT  1,756,773

HAND TOOL

Filed Sept. 7, 1926

Inventor
Alfred Wendt,
By
Attorney

Patented Apr. 29, 1930

1,756,773

UNITED STATES PATENT OFFICE

ALFRED WENDT, OF FRESNO, CALIFORNIA

HAND TOOL

Application filed September 7, 1926. Serial No. 133,995.

My invention relates to improvements in hand tools, which while possessing particular advantages for use as an engraver's tool may be used for many other classes of tools and perform the function for which it is intended in an efficient, reliable and practical manner.

One object of my invention is the provision of a tool which will permit the adjustment of the engraving implement or other implement with reference to the handle and according to the work as well as to take up any wear upon the implement.

Another object of my invention is the provision of a tool which will adjust the length of the implement and retain the same in the adjusted position, and which will possess merit in point of simplicity, durability and inexpensiveness of production.

Another object of my invention is the provision of a tool which may be used for many purposes and in which the adjustments may be quickly obtained to suit conditions and which in every particular will prove efficient and practical.

With these objects in view my invention consists of a tool of the character described embodying novel features of construction and combination of parts for service, substantially as described and claimed and as shown in the accompanying drawing, in which:

Referring by numeral to the drawing in which similar numbers of reference are used to denote the same parts in all the views.

Figure 1:
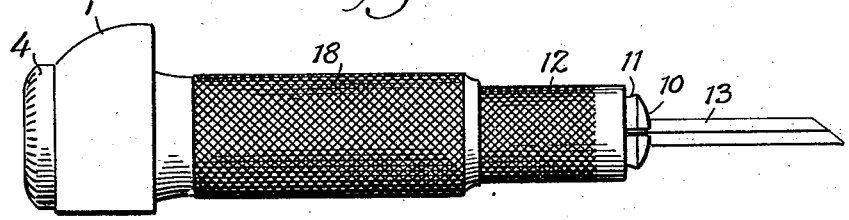
Fig. 1 represents a side elevation of a hand tool constructed in accordance with and embodying my invention.
Figure 2:
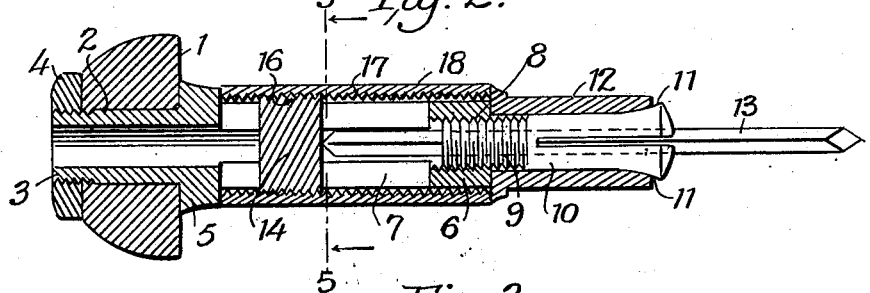
Fig. 2 represents a vertical central sectional view thereof.
Figure 3:
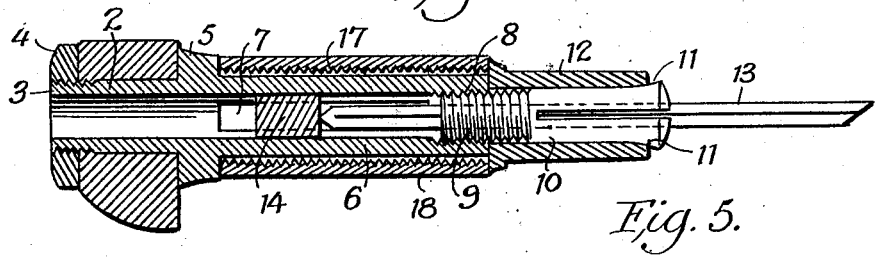
Fig. 3 represents a similar view taken at right angle to Fig. 2.
Figure 4:
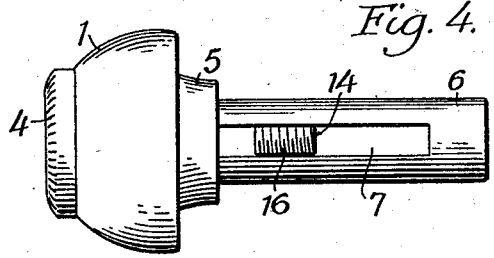
Fig. 4 represents a detailed view of the slotted shank and adjusting wing nut mounted therein.
Figure 5:
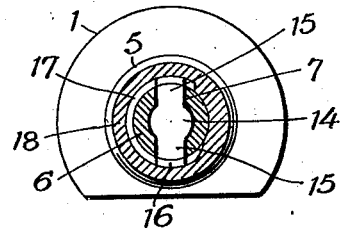
Fig. 5 represents a sectional view on line 5—5 of Fig. 2.

The numeral 1 designates the handle of the tool, which fits upon the sleeve 2, having the threaded end 3, engaged by securing nut 4, and further provided with the annular flange 5, and the shank 6, which is provided with the oppositely disposed slots 7, and the threaded end 8, which threaded end receives the threaded stem 9, formed on the chuck 10, the jaws of which are tapered at 11, to be drawn inward within the sleeve or ferrule 12, to cause the jaws to clamp the tool 13, in reliable position.

From this construction it will be noted that rotation of the shank with respect to the chuck 10 causes the threaded end 8 thereof to act upon the threaded stem 9, to cause the jaws of the chuck 10, to engage and retain the tool in any desired adjustment, and the inner end of the tool is adapted to seat upon the follower 14, which is provided with wings 15, which fit and are guided in the slots 7 of the shank 6, and are provided upon the periphery with threads 16, which engage the thread 17 of the rotary sleeve 18, thus permitting upon the rotation of said sleeve 18 the raising or lowering of the follower and consequently the adjustment of the tool, as to length and wear as circumstances control.

From the foregoing description taken in connection with the drawing the operation and advantages of my structure will be readily understood and appreciated and it will be at once apparent that I provide means which will clamp the tool in any desired adjustment with reference to the handle and which will insure the adjustment and retention of the tool to suit various conditions, and thus provide a practical, efficient and highly desirable improvement of this character.

I claim:

A device of the character described, comprising a tubular shank having a pair of oppositely disposed slots and interior threads in one end, a handle secured to said shank at its other end, a follower mounted in said tubular shank and having wings fitting in said slots of the shank and provided with threads upon their periphery, a sleeve encircling the entire length of said tubular shank and having interior threads to engage the threads on the periphery of said wings of the follower, a tool having its inner end in engagement with said follower, a chuck consisting of a pair of jaws flared at their outer ends and through which jaws said tool passes and is adapted to be clamped, said chuck having a threaded stem engaging said interior threads of the tubular shank, and a sleeve surrounding said chuck and shaped at one end to bear against the flared portion of the jaws of said chuck and having an interiorly threaded portion to engage a portion of the threads on the stem of said chuck to effect the opening and closing of the jaws of said chuck.

In testimony whereof I hereunto affix my signature.

ALFRED WENDT.